United States Patent [19]

Tanaka et al.

[11] Patent Number: 4,639,014

[45] Date of Patent: Jan. 27, 1987

[54] VEHICLE SUSPENSION APPARATUS

[75] Inventors: Tadao Tanaka, Okazaki; Sunao Chikamori, Nagoya; Mitsuhiko Harara, Okazaki; Yasutaka Taniguchi; Masanaga Suzumura, both of Nagoya; Minoru Tatemoto, Okazaki; Naotake Kumagai, Aichi; Hiroki Abe; Shozo Takizawa, both of Okazaki, all of Japan

[73] Assignee: Mitsubishi Jidosha Kogyo Kabushiki Kaisha, Tokyo, Japan

[21] Appl. No.: 727,285

[22] Filed: Apr. 25, 1985

[30] Foreign Application Priority Data

Apr. 25, 1984 [JP] Japan ............................. 59-60925[U]
Apr. 8, 1985 [JP] Japan ............................. 60-51959[U]

[51] Int. Cl.[4] .............................................. B60G 11/26
[52] U.S. Cl. .................................. 280/707; 280/6 H; 280/708; 280/714; 280/DIG. 1
[58] Field of Search ................ 280/707, DIG. 1, 6 H, 280/6 R, 708, 714

[56] References Cited

U.S. PATENT DOCUMENTS 4,313,529 2/1982 Kato et al. ........................ 280/714
4,568,096 2/1986 Yew et al. ........................ 280/707

FOREIGN PATENT DOCUMENTS 53-26021 10/1978 Japan .

Primary Examiner—John J. Love
Assistant Examiner—Kenneth R. Rice
Attorney, Agent, or Firm—Frishauf, Holtz, Goodman & Woodward

[57] ABSTRACT

The characteristic of the suspension is held to be a soft one when the vehicle is running along a flat surface, while it is automatically switched by the switch unit to a hard one when the cycle period T of vertical vibration of the vehicle height becomes near the cycle of the natural vibration of sprung mass of the suspension at the time of running along a road having an irregular surface or jumping a projection, thereby suppressing the resonance of the vehicle body due to external force applied from the road to improve the comfortability.

16 Claims, 4 Drawing Figures

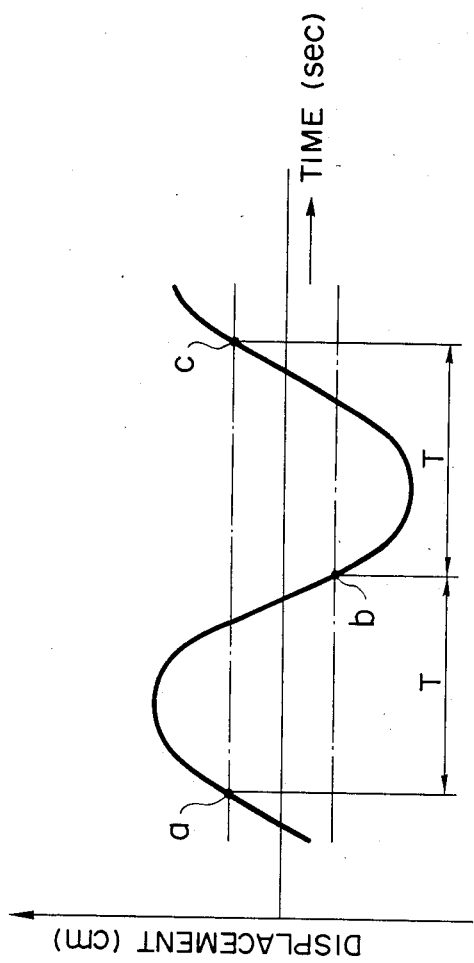

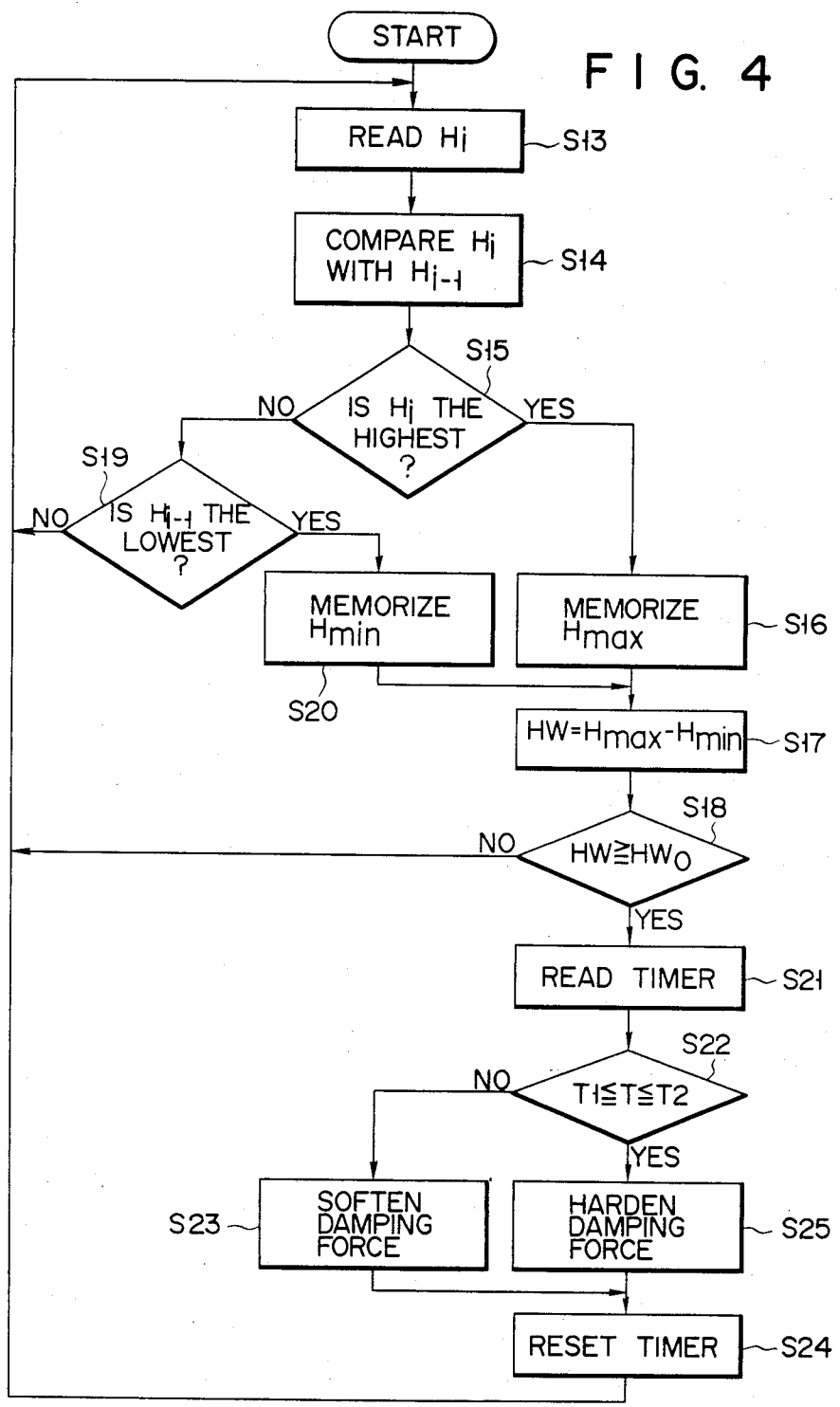

VEHICLE SUSPENSION APPARATUS

BACKGROUND OF THE INVENTION

This invention relates to a vehicle suspension apparatus, the spring characteristic of which is switched over to a hard one when the cycle period of vertical vibration of the vehicle height is within a predetermined period of time.

An electronically controlled vehicle suspension apparatus has been proposed, in which the damping force of a shock absorber or spring constant of an air spring of a suspension unit for each wheel is electronically controlled to improve the comfortability of the passenger. In such an electronically controlled vehicle suspension apparatus, it is desired for the improvement of the comfortability that the characteristic of the suspension is automatically switched to a hard one to thereby reduce the vertical vibration of the vehicle height while the vehicle is running along a road having an irregular surface.

SUMMARY OF THE INVENTION

An object of the invention is to provide a vehicle suspension apparatus, in which the characteristic of the suspension is held to be a soft one while the vehicle is running along a flat surface while it is automatically switched to a hard one when the cycle period of vertical vibration of the vehicle height becomes near the natural vibration of sprung mass (i.e., vehicle body) of the suspension at the time of running along a road having an irregular surface or jumping a projection, thereby suppressing the resonance of the vehicle body due to external force applied from the road to improve the comfortability.

BRIEF DESCRIPTION OF THE DRAWINGS

FIG. 3 is a graph showing a relation between vehicle height change and measured time T in the first example; and FIG. 4 is a flow chart showing a second example of operation.

DETAILED DESCRIPTION OF THE PREFERRED EMBODIMENT

Now, an embodiment of the invention will be described in detail with reference to the drawings.

Figure 1:
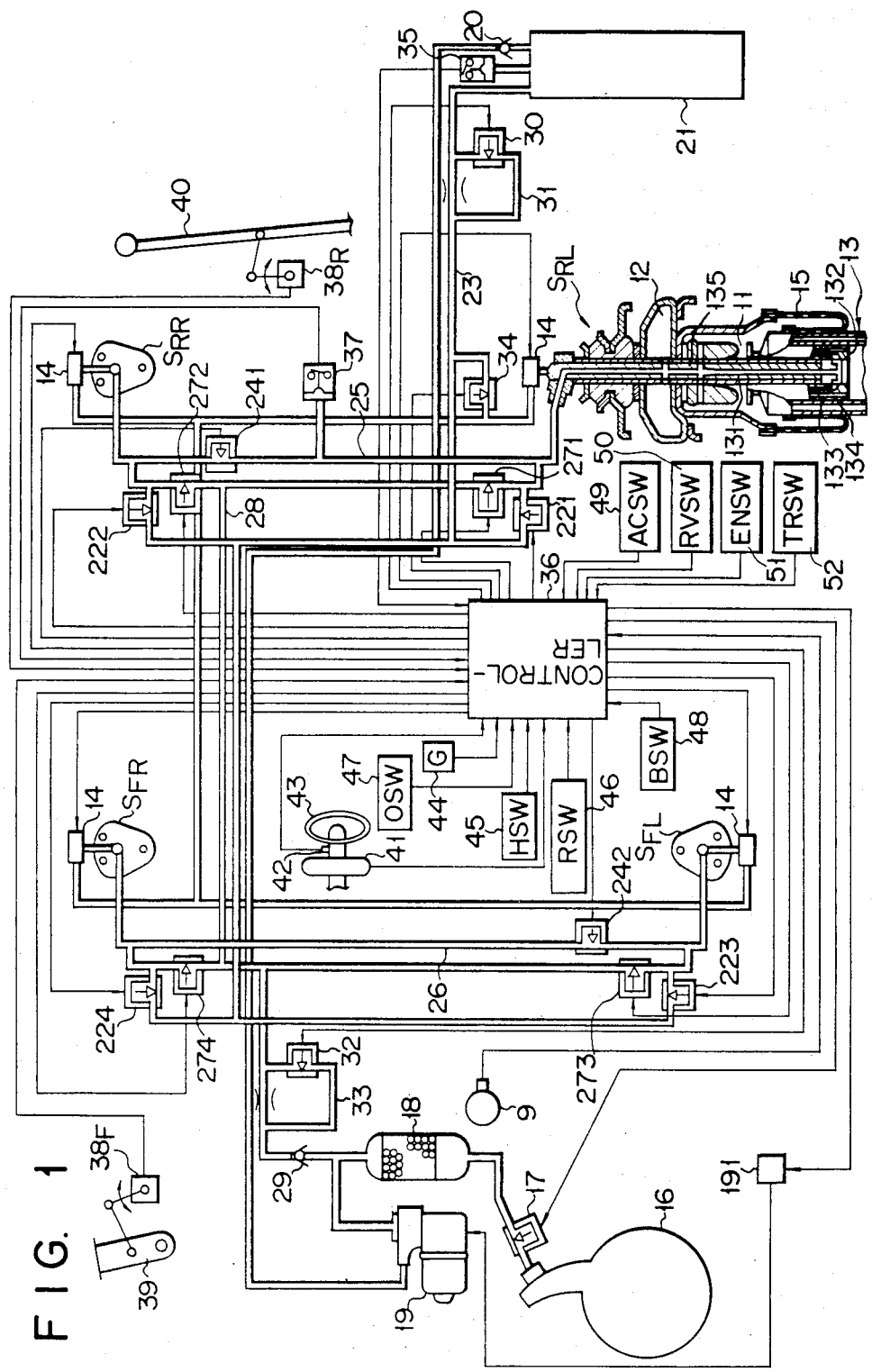
FIG. 1 is a schematic representation of a vehicle suspension apparatus according to the invention.

FIG. 1 shows an embodiment of the vehicle suspension apparatus according to the invention. The apparatus comprises a right front wheel suspension unit $S_{FR}$, a left front wheel suspension unit $S_{FL}$, right rear wheel suspension unit SRR, and left rear wheel suspension unit $S_{RL}$. These suspension units $S_{FR}$, $S_{FL}$, $S_{RR}$ and $S_{RL}$ have an identical construction, so only the suspension unit $S_{RL}$ will be described in detail. The suspension unit $S_{RL}$ includes a mean air spring chamber 11, an auxiliary air spring chamber 12, a shock absorber 13 and a coil spring (not shown) used as an auxiliary spring. The shock absorber 13 provides a damping force, which is switched between hard and soft by a pneumatic switch unit (actuator) 14. The switch unit 14 opens and closes a passage 133 formed in a piston 132 of the shock absorber 13 by turning a control rod 131 about an axis thereof. In this way, the area of the passage communicating two chambers defined in the shock absorber 13 by the piston 132 is controlled to switch the attenuating force of the shock absorber 13 between hard and soft. Reference numeral 134 designates a passage formed in the piston 132, through which passage the two chambers in the shock absorber 13 are communicated with each other at all time. Reference numeral 15 designates a bellows defining the main air spring chamber. The switch unit 14 controls the communication and non-communication between the main and auxiliary air spring chambers 11 and 12 through the communication passage 135 to effect switching of the air spring between hard and soft. The switch units 14 are all controlled by a controller 36 including a microcomputer.

Reference numeral 16 designates an air cleaner, and 17 a solenoid valve for blocking external air. Air from the air cleaner 16 is supplied through the solenoid valve 17 to a drier 18. Dry air from the drier 18 is supplied to a compressor 19, and compressed air therefrom is supplied through a check valve 20 to and stored in a reservoir tank 21. The compressor 19 is furnished with drive power from a generator which is driven from an engine (not shown). A relay 191 for the compressor 19 is controlled by the controller 36.

The reservoir tank 21 is connected to the main and auxiliary air spring chamber 11 and 12 of the individual suspension units $S_{FR}$, $S_{FL}$, $S_{RR}$ and $S_{RL}$ via an air supply duct line 23, on which respective air supply solenoid valves 221 to 224 are mounted. The main and auxiliary air spring chambers 11 and 12 of the suspension units SRL and SRR are communicated with one another via a communication line 25, on which a communicating solenoid valve 241 is mounted. The main and auxiliary air spring chambers 11 and 12 of the suspension units SFL and SFR are communicated with one another via a communication line 26, on which a communicating solenoid valve 242 is mounted. Compressed air in the main and auxiliary air spring chambers 11 and 12 of the individual suspension units $S_{FR}$, $S_{FL}$, $S_{RR}$ and $S_{RL}$ is discharged through an exhaust duct line 28, on which respective exhaust solenoid valves 271 to 274 are mounted, check valve 29, drier 18, solenoid valve 17 and air cleaner 16.

A line 31 is provided in parallel with the air supply line 23, and air supply flow path selection solenoid valve 30 is mounted on the line 31. A line 33 is provided in parallel with the exhaust line 28, and an exhaust flow path selection solenoid valve 32 is mounted on the line 33. A hard/soft switching solenoid valve 34 is provided between the air supply line 23 and switch unit 14, and is on-off controlled by a signal from the controller 36.

The solenoid valves 17, 221 to 224, 271 to 274, 30 and 34 are normally closed valves, and solenoid valves 241 and 242 are normally open valves.

A pressure sensor 35 detects the pressure in the reservoir tank 21, and a detection signal from the pressure sensor 35 is fed to the controller 36. A pressure sensor 37 senses the pressure in the main and auxiliary chambers of the rear wheel suspension units $S_{RL}$ and $S_{RR}$, and a detection signal from the pressure sensor 37 is fed to the controller 36.

A vehicle height sensor 38F, which is mounted between a front right lower arm of the suspension and a vehicle body of the vehicle, senses the height of a front portion of the vehicle. A vehicle height sensor 38R, which is mounted between a rear left lateral rod 40 of the suspension and vehicle body of the vehicle, senses the height of a rear portion of the vehicle. Vehicle height detection signals from the vehicle height sensors 38F and 38R are fed to the controller 36. The vehicle height sensors 38F and 38R each consist of a hole IC element and a magnet, one of these being mounted on the wheel side and the other on the vehicle body side, and detect a distance from the normal height level, a high height level or a low height level of the vehicle. A vehicle speed sensor 41 senses the vehicle speed, and a steering angle sensor 42 senses the steering angle of a steering wheel 43. Detection signals from these sensors 41 and 42 are fed to the controller 36. An accleration sensor 44 senses acceleration exerted to the vehicle body in the forward and rearward directions, leftward and rightward direction and upward and downward directions. This sensor may use a wright and a light-blocking member interlocked thereto. In the absence of any exerted acceleration, and the interlocked light-blocking member is blocking light from a light-emitting diode so that no light is incident on a photodiode. Absence of acceleration is thus detected. When the weight is inclined or move, it is detected that an acceleration is exerted to the vehicle body.

A vehicle height selection switch 45 can select a high vehicle height (HIGH), a low vehicle height (LOW) and an automatic vehicle height control mode (AUTO). A rolling control selection switch 46 can select a control mode for reducing rolling of the vehicle. Signals of these switches 45 and 46 are fed to the controller 36. An oil pressure sensor (OSW) 47 senses the pressure P of engine lubrication oil. A brake sensor (BSW) 48 senses the extent of brake pedal depression. An acceleration aperture sensor 49 senses the engine acceleration aperture. An engine revolving rate sensor (RVSW) 50 senses the revolving rate N of the engine. An engine switch (ENSW) 51 is an ignition switch or the like for starting the engine. A transmission stage sensor (TRSW) 52 senses a speed change stage of the transmission. Output signals of the switches 45, 46 and 51 and sensors 47 to 50 and 52 are fed to the controller 36.

The controller 36 controls the vehicle height by comparing the vehicle height detected by the vehicle height sensors 38F and 38R to a desired vehicle height set by the vehicle height selection switch 45 and controlling the individual control valves such as to let the vehicle height coincide with the desired vehicle height.

The controller 36 further has a vehicle position or rolling control function of controlling the individual solenoid valves such as to cancel changes in the vehicle attitude, the vehicle attitude change and sense thereof being sensed by respective sensors.

When the vehicle height control noted above is done, the vehicle height is changed slowly by closing the air supply flow path selection solenoid valve 30 and exhaust flow path selection solenoid valve 32, thereby reducing the passenger's uncomfortability at the time of the vehicle height control. When the rolling control noted above is done, the air supply flow path selection solenoid valve 30 and exhaust flow path selection between solenoid valve 32 are opened, whereby it is possible to sufficiently cope with even a sudden attitude change.

Figure 2:
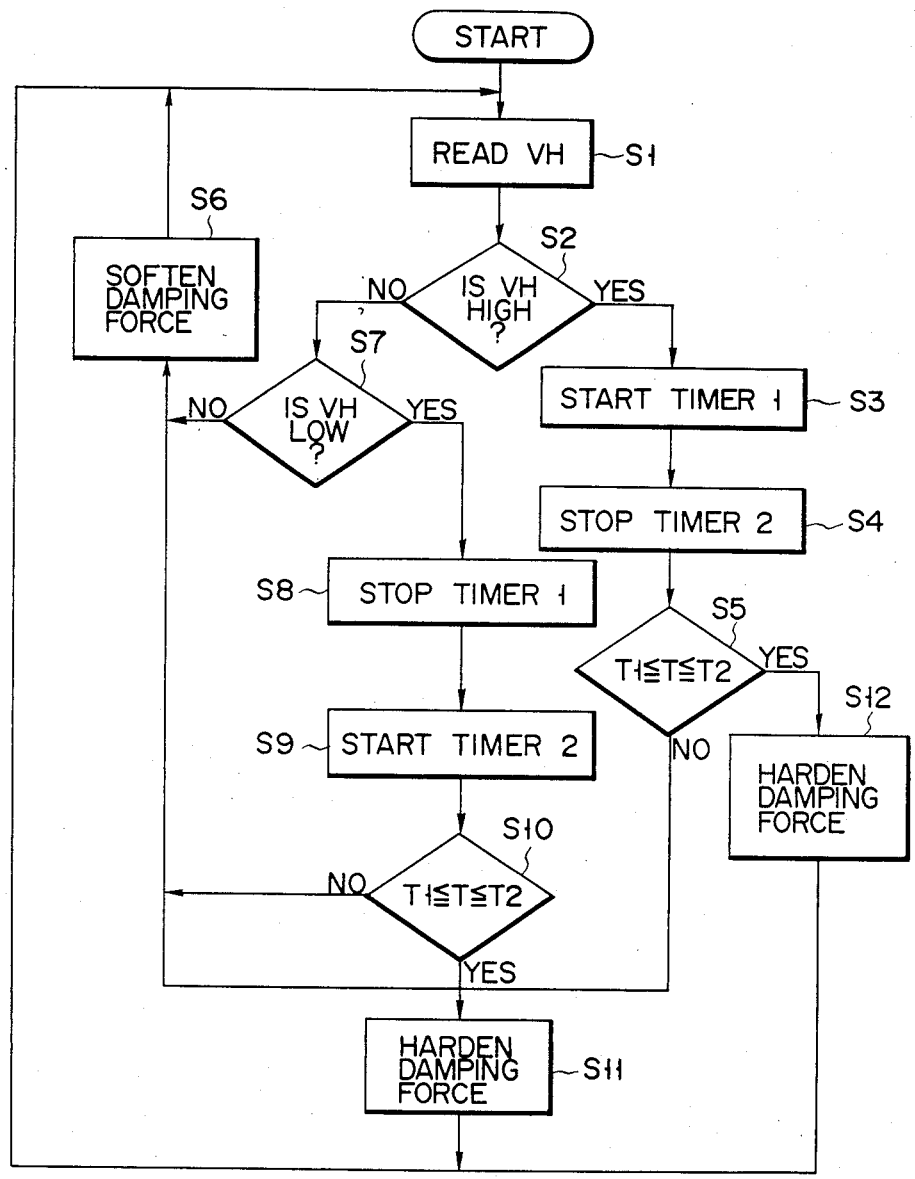
FIG. 2 is a flow chart showing an example of operation of the vehicle suspension apparatus shown in FIG. 1.

The operation of the embodiment having the above construction will now be described in connection with a first example with reference to FIG. 2. The flow chart of FIG. 2 shows a routine of the controller 36 executed when the engine switch 51 is turned on. In a first step S1, a vehicle height detection signal representing the vehicle height, provided from the front or rear vehicle height sensor 38F or 38R, is fed to the controller 36. In a subsequent step S2, a check is done as to whether the vehicle height is high. The controller 36 decides that the vehicle height is high or low when the vehicle height detected by the vehicle height sensor 38F or 38R is different from a preset vehicle height by more than a preset amount as shown in FIG. 3. If the decision of the check in the step S2 is "YES", the routine proceeds to a step S3, in which the time measuring operation of timer 1 provided in the controller 36 is started. The timer 1 measures a period of time taken for a change of the vehicle height from the high level to the lower level. That is, the timer 1 measures a time from point a to point b in FIG. 3. In a subsequent step S4, the time measuring operation of the timer 2 provided in the controller 36 is stopped. This timer 2 measures a period of time taken for a change of the vehicle height from the low level to the high level. That is, the timer 2 measures a time from point b to point c in FIG. 3.

In a subsequent step S5, a check is done as to whether the time T taken for the change of the vehicle height from the low level to the high level, measured by the timer 2, is longer than T1 and shorter than T2. The times T1 and T2 are set to be in the neighborhood of the period of the natural vibration of sprung mass of the suspension apparatus and, for instance, $T1=1/3.2$ sec and $T2=1/2.4$ sec. Since the timer 2 has not yet started the time measuring operation, the decision of the check is "NO", and the routine goes to a step S6, in which the damping force (spring constant) of the suspension apparatus is rendered soft. More specifically, the hard/soft switching solenoid valve 34 is closed by a control signal provided from the controller 36. As a result, compressed air is no longer supplied from the reservoir tank 21 to the actuators 14, so that the damping force (spring constant) of the suspension units for the individual vehicles rendered and held soft. The routine then goes back the step S1 and then to the step S2 of checking whether the vehicle height is high. If the decision of the check in the step S2 is "NO", the routine proceeds to a step S7 of checking whether the vehicle height is low. If the decision of the check in the step S7 is "YES", the routine goes to a step S8, in which the time measuring operation of the timer 1 is stopped. It is to be understood that the time taken for a change of the vehicle height from the high level to the low level is measured by the timer 1. In a subsequent step S9, the time measuring operation of the timer 2 is started. In a subsequent step S10, a check is done as to whether the time taken for a change of the vehicle height from the low level to the high level, measured by the timer 1, is longer than T1 sec. and shorter than T2 sec. If the decision of the check in the step S10 is "YES", the routine proceeds to a step S11. In the step S11, the hard/soft switching solenoid valve 34 is opened by a control signal provided from the controller 36. As a result, compressed air is supplied from the reservoir tank 21 to the actuators 14, so that the actuators 14 are rendered operative to render and hold the damping force (spring constant) of the suspension units for the individual wheels hard.

If "YES" in step S5, the flow advances to step S12, in which the damping force (spring constant) of the suspension units is rendered hard as well as in step S11.

It is to be noted that in this example it is decided that the period of the vertical vibration of the vehicle is in the neighborhood of the natural vibration of sprung mass of the suspension apparatus if the time T taken for a change of the vehicle height from the high level to the low level or vice versa is $T1 \leq T \leq T2$, and as a result the suspension characteristic is rendered hard. In this way, the vertical vibrations of the vehicle body are reduced to improve the comfortability.

The operation will now be described in conjunction with a second example with reference to FIG. 4. The flow chart of FIG. 4 is a routine which is executed by the controller 36 when the engine switch 51 is turned on. In a first step S13, the vehicle height Hi represented by a vehicle height detection signal provided from the front or rear vehicle height sensor 38F or 38R is read out into the controller 36. In a subsequent step S14, the detected vehicle height Hi is compared with vehicle height data Hi-1 previously read into the controller 36. In a subsequent step S15, a check is done as to whether the change in the vehicle height constitutes a turning point from increase to decrease, i.e., a peak on the high level side. If the decision of the check in the step S15 is "YES", the routine proceeds to a step S16, in which the high level side peak is read into the controller 36. In a subsequent step S17, the extent of the vehicle height change between the high level side peak and low level side peak, i.e., a turning point of the vehicle height change from decrease to increase. In a subsequent step S18, a check is done as to whether the extent of the vehicle height change is greater than a preset level. The preset level of the extent of the vehicle height change is such that the vibrations of the vehicle body caused by an external force applied from the road surface to the wheels does not have an effect of deteriorating the comfortability of the passenger so long as the vehicle height change is less than the preset level. Since at this time the low level side peak has not yet been read into the controller 36, the decision of the check is "NO", so that the routine goes back to the step S13. When the step S15 eventually yields a decision "NO" with decrease of the vehicle height, the routine proceeds to a step S19, in which a check is done as to whether the vehicle height is at the lower level side peak. If the decision of the check in the step S19 is "NO", the routine goes back to the step S13. If the decision of the check in the step S19 is "YES", the routine proceeds to a step S20, in which the low level side peak is read into the controller 36. In a subsequent step S17, the extent of the vehicle height change between the high and low level peaks is calculated. In a subsequent step S18, a check is done as to whether the extent of the vehicle height change is above a preset level. If the decision is "NO", the routine goes back to the step S13 of detecting the vehicle height. If the decision of the check in the step S18 is "YES", the routine goes to a step S21, in which the content of timer provided in the controller 36 is read out. The timer measures the time between the two vehicle height peaks. In a subsequent step S22, a check is done as to whether the time T measured by the timer is longer than T1 and shorter than T2, i.e., the natural vibration range of sprung mass of the suspension apparatus. If the decision of the check in the step S22 is "NO", the routine proceeds to a step S23, in which the damping force (spring constant) of the suspension apparatus is rendered soft. In step S24, the timer T is reset and the time measuring operation of timer T is started. The routine then goes back to the step S13 of detecting the vehicle height. If the decision of the check in the step S22 is "YES", it is concluded that the cycle of the vertical vibration of the vehicle height is in the neighborhood of the natural vibration of sprung mass of the suspension apparatus, so that the routine goes to a step S25, in which the damping force (spring constant) of the suspension apparatus is rendered hard.

As has been shown, with the second example shown in FIG. 4 the same effects as in the preceding first example can be obtained.

As has been described in the foregoing, it is possible to provide a vehicle suspension apparatus, in which when the cycle period of vertical vibration of the vehicle body becomes near that of the natural vibration of sprung mass of the suspension apparatus when the vehicle is running along a road of an irregular surface or jumping a projection, the suspension characteristic is automatically switched to the hard one to improve the comfortability.

What is claimed is:

1. A vehicle suspension apparatus comprising:
   a vehicle height sensor means for detecting the vehicle height;
   timer means coupled to the sensor means for determining a cycle period of vertical vibration of the vehicle height;
   switching means coupled to a control means for switching the characteristic of the suspension apparatus to a hard one or a soft one; and
   said control means being coupled to said timer means for causing said switching means to hold said suspension apparatus characteristic to said hard one while the cycle period of vertical vibration of the vehicle height is within a predetermined interval of time.

2. The vehicle suspension apparatus according to claim 1, wherein said cycle period is calculated through measurement of the time taken for a change of the vehicle height between preset high and low level side vehicle heights by a timer.

3. The vehicle suspension apparatus according to claim 2, wherein said preset high and low level side vehicle heights are spaced apart by an equal distance from a normal vehicle height upwards and downwards, respectively.

4. The vehicle suspension apparatus according to claim 1, wherein said control means causes said switching means to switch said suspension apparatus characteristic to the hard one when it is determined that the extent of vehicle height change in the vertical vibration of the vehicle height detected by said vehicle height sensor is above a preset amount between high and low level side peaks and also that the time taken for the change of the vehicle height between said high and low level side peaks is within said predetermined interval of time.

5. The vehicle suspension apparatus according to claim 1, wherein said predetermined interval of time is in the neighborhood of the cycle period of the natural vibration of sprung mass of the suspension apparatus.

6. The vehicle suspension apparatus according to claim 1, which further comprises a main fluid spring chamber and an auxiliary fluid spring chamber capable of being communicated therewith, and in which said switching means is a spring constant switching means including an on-off valve for switching the spring constant through control of the communication and non-communication between said fluid spring chambers.

7. The vehicle suspension apparatus according to claim 1, which further comprises a shock absorber, and in which said switching means is damping force switching means for switching the damping force of said shock absorber.

8. The vehicle suspension apparatus according to claim 1, which further comprises:
a fluid spring chamber;
fluid supply means capable of supplying fluid into said fluid spring chamber through a fluid supply control on-off valve;
fluid exhausting means capable of exhausting fluid from said fluid spring chamber through an exhaust control on-off valve; and
vehicle height control means for comparing a signal from said vehicle height sensor to a desired vehicle height and producing a vehicle height control signal for on-off controlling said fluid supply and exhaust control on-off valves to make the detected vehicle height to be coincident with said desired vehicle height.

9. The vehicle suspension apparatus according to claim 1, wherein said switching means is a pneumatic actuator.

10. The vehicle suspension apparatus according to claim 1, wherein said control means is a controller including a microcomputer.

11. The vehicle suspension apparatus according to claim 3, wherein said predetermined interval of time is in the neighborhood of the cylce period of the natural vibration of sprung mass of the suspension apparatus.

12. The vehicle suspension apparatus according to claim 4, wherein said predetermined interval of time is in the neighborhood of the cycle period of the natural vibration of sprung mass of the suspension apparatus.

13. The vehicle suspension apparatus according to claim 11, which further comprises a shock absorber, and in which said switching means is damping force switching means for switching the damping force of said shock absorber.

14. The vehicle suspension apparatus according to claim 12, which further comprises a shock absorber, and in which said switching means is damping force switching means for switching the damping force of said shock absorber.

15. The vehicle suspension apparatus according to claim 13, which further comprises a main fluid spring chamber and an auxiliary fluid spring chamber capable of being communicated therewith, and in which said switching means is a spring constant switching means including an on-off valve for switching the spring constant through control of the communication and non-communication between said fluid spring chambers.

16. The vehicle suspension apparatus according to claim 14, which further comprises a main fluid spring chamber and an auxiliary fluid spring chamber capable of being communicated therewith, and in which said switching means is a spring constant switching means including an on-off valve for switching the spring constant through control of the communication and non-communication between said fluid spring chambers.

* * * * *